(12) United States Patent
Mishima et al.

(10) Patent No.: US 12,355,587 B2
(45) Date of Patent: Jul. 8, 2025

(54) COMMUNICATION DEVICE, COMMUNICATION SYSTEM, COMMUNICATION AND CONTROL METHOD

(71) Applicant: Panasonic Intellectual Property Management Co., Ltd., Osaka (JP)

(72) Inventors: Masashi Mishima, Osaka (JP); Daisuke Sonoda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 327 days.

(21) Appl. No.: 17/757,154

(22) PCT Filed: Dec. 10, 2020

(86) PCT No.: PCT/JP2020/045963
§ 371 (c)(1),
(2) Date: Jun. 10, 2022

(87) PCT Pub. No.: WO2021/131724
PCT Pub. Date: Jul. 1, 2021

(65) Prior Publication Data
US 2022/0368559 A1 Nov. 17, 2022

(30) Foreign Application Priority Data
Dec. 25, 2019 (JP) .................................. 2019-234940

(51) Int. Cl.
*H04L 12/403* (2006.01)
(52) U.S. Cl.
CPC .................................. *H04L 12/403* (2013.01)

(58) Field of Classification Search
CPC ........... H04W 72/0446; H04W 56/001; H04W 72/20; H04W 84/20; H04W 84/22;
(Continued)

(56) References Cited

U.S. PATENT DOCUMENTS 6,317,415 B1 * 11/2001 Darnell ............... H04L 12/6418
370/468
2002/0191588 A1 12/2002 Personick
(Continued)

FOREIGN PATENT DOCUMENTS

| GB | 2541757 A | 3/2017 |
| JP | 2018-064245 | 4/2018 |
| JP | 2019-139630 | 8/2019 |

OTHER PUBLICATIONS

The EPC Office Action dated Jan. 12, 2023 for the related European Patent Application No. 20906324.7.
(Continued)

*Primary Examiner* — Dady Chery
(74) *Attorney, Agent, or Firm* — Rimon P.C.

(57) ABSTRACT

A communication device includes a processing part and a communication part that communicates with one or more slaves. The processing part has a function of executing communication processing and setting processing. The communication processing is processing for transmitting a main frame including main data from the communication part to one or more slaves in a first period. The setting processing is processing for setting a second period shorter than the first period and a time slot allocated to at least one slave among the one or more slaves in every second period.

20 Claims, 4 Drawing Sheets

(58) Field of Classification Search
CPC ...... H04J 3/0667; H04L 12/403; H04L 45/16; H04L 47/826; H04L 47/781
See application file for complete search history.

(56) References Cited

U.S. PATENT DOCUMENTS

| | | | |
|---|---|---|---|
| 2008/0175207 A1* | 7/2008 | Lee | H04L 65/61 370/337 |
| 2015/0305028 A1* | 10/2015 | Shibuta | H04W 84/20 370/329 |
| 2019/0253356 A1 | 8/2019 | Yoneda et al. | |
| 2020/0036786 A1 | 1/2020 | Yoneda et al. | |

OTHER PUBLICATIONS

International Search Report of PCT application No. PCT/JP2020/045963 dated Feb. 22, 2021.

\* cited by examiner

COMMUNICATION DEVICE, COMMUNICATION SYSTEM, COMMUNICATION AND CONTROL METHOD

CROSS-REFERENCE TO RELATED APPLICATIONS

This application is a U.S. national stage application of the PCT International Application No. PCT/JP2020/045963 filed on Dec. 10, 2020, which claims the benefit of foreign priority of Japanese patent application No. 2019-234940 filed on Dec. 25, 2019, the contents all of which are incorporated herein by reference.

FIELD OF THE INVENTION

The present disclosure generally relates to a communication device, a communication system, a communication control method, and a program. More specifically, the present disclosure relates to the communication device, the communication system, the communication control method, and the program that communicate with one or more slaves.

DESCRIPTION OF THE RELATED ART

PTL 1 discloses a communication device that is connected to a network and in which data is updated in every predetermined period. The communication device includes first scheduling part and a second scheduling part. The first scheduling part secures a first communication band necessary for updating first data used for controlling a manufacturing apparatus or a production facility in every predetermined period. The second scheduling part secures a second communication band necessary for causing second data to arrive at a transmission destination within a designated time. The second communication band is other than the first communication band among communication bands of the network.

In the communication device described in PTL 1, the second data (sub-data) can be transmitted in a free band other than a communication band necessary for communicating the first data (main data). However, this communication device has a problem that it is difficult for a device (slave) connected to the communication device to periodically transmit, receive, or transmit and receive the second data (sub-data).

CITATION LIST

Patent Literature

PTL 1: Unexamined Japanese Patent Publication No. 2018-64245

SUMMARY OF THE INVENTION

The present disclosure has been made in view of the above point, and an object of the present disclosure is to provide a communication device, a communication system, a communication control method, and a program that make it easy for a slave connected to a communication device to periodically transmit, receive, or transmit and receive sub-data.

A communication device according to one aspect of the present disclosure includes a processing part, and a communication part that communicates with one or more slaves. The processing part has a function of executing communication processing and setting processing. The communication processing is processing for transmitting a main frame including main data from the communication part to the one or more slaves in a first period. The setting processing is processing for setting a second period shorter than the first period and a time slot allocated to at least one slave among the one or more slaves in every second period.

A communication system according to another aspect of the present disclosure includes the communication device and the one or more slaves. The one or more slaves are connected to the communication device and communicate with the communication device.

A communication control method according to another aspect of the present disclosure includes a communication step and a setting step. The communication step is a step of transmitting a main frame including main data to the one or more slaves connected to the communication device in a first period. The setting step is a step of setting a second period shorter than the first period and a time slot allocated to at least one slave among the one or more slaves in every second period.

A program according to another aspect of the present disclosure causes one or more processors to execute the communication control method described above.

The present disclosure has an advantage that it is easy for the slave connected to the communication device to periodically transmit, receive, or transmit and receive sub-data.

DETAILED DESCRIPTION OF THE PREFERRED EMBODIMENTS (1) Outline

Figure 1:
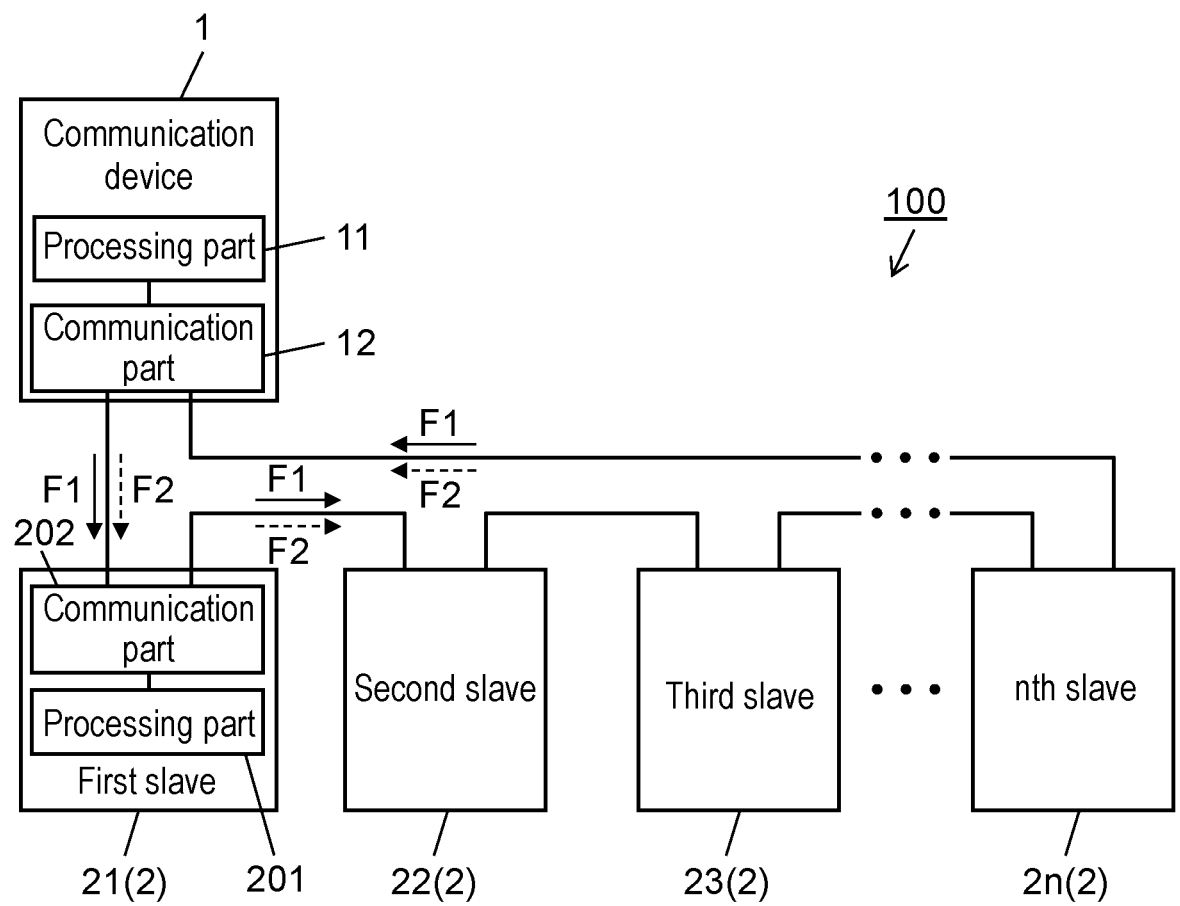
FIG. 1 is a block diagram illustrating an outline of a communication system having a communication device according to an exemplary embodiment of the present disclosure.

FIG. 1 is a block diagram illustrating an outline of communication system 100 having communication device 1 according to an exemplary embodiment of the present disclosure. As illustrated in FIG. 1, communication device 1 according to the present exemplary embodiment is connected to one or more (here, n ("n" is a natural number)) slaves 2, connected to communication device 1, directly or via a network to constitute communication system 100. That is, communication device 1 is a master corresponding to a host device of one or more slaves 2. Communication device 1 and one or more slaves 2 are connected to one network. That is, communication system 100 includes communication device 1 and one or more slaves 2. One or more slaves 2 are connected to communication device 1 and communicate with communication device 1.

In the present exemplary embodiment, communication device 1 and one or more slaves 2 are connected to industrial network. The "industrial network" in the present disclosure is a field network used in factory automation, for example, and is used for communication between a plurality of devices installed in a factory. The industrial network may include, for example, Ethernet/internet protocol (Ethernet/ IP) (registered trademark), Ether for Control Automation Technology (EtherCAT: registered trademark), or PROFI-NET (registered trademark). The device connected to the industrial network may include, for example, a controller (a programmable logic controller (PLC) or the like), a sensor (a displacement sensor, a flowmeter, a pressure gauge, an image sensor, or the like), or a remote input and output (I/O). Furthermore, the device connected to the industrial network may include, for example, a servo amplifier, an inverter, a robot, an actuator, or a valve.

The industrial network is required to have robustness, punctuality, and real time property as compared with standard best-effort networks used in offices and the like. For example, in the industrial network, in a case where control data is periodically transmitted from a controller to a device such as a servo amplifier to be controlled, a delay is not allowed as compared with the best-effort networks. Further, an increase in a response speed to the control data is required.

As illustrated in FIG. 1, communication device 1 according to the present exemplary embodiment includes processing part 11 and communication part 12. Communication part 12 is a communication interface for communication with one or more slaves 2. Processing part 11 has a function of executing communication processing and setting processing.

Figure 2:
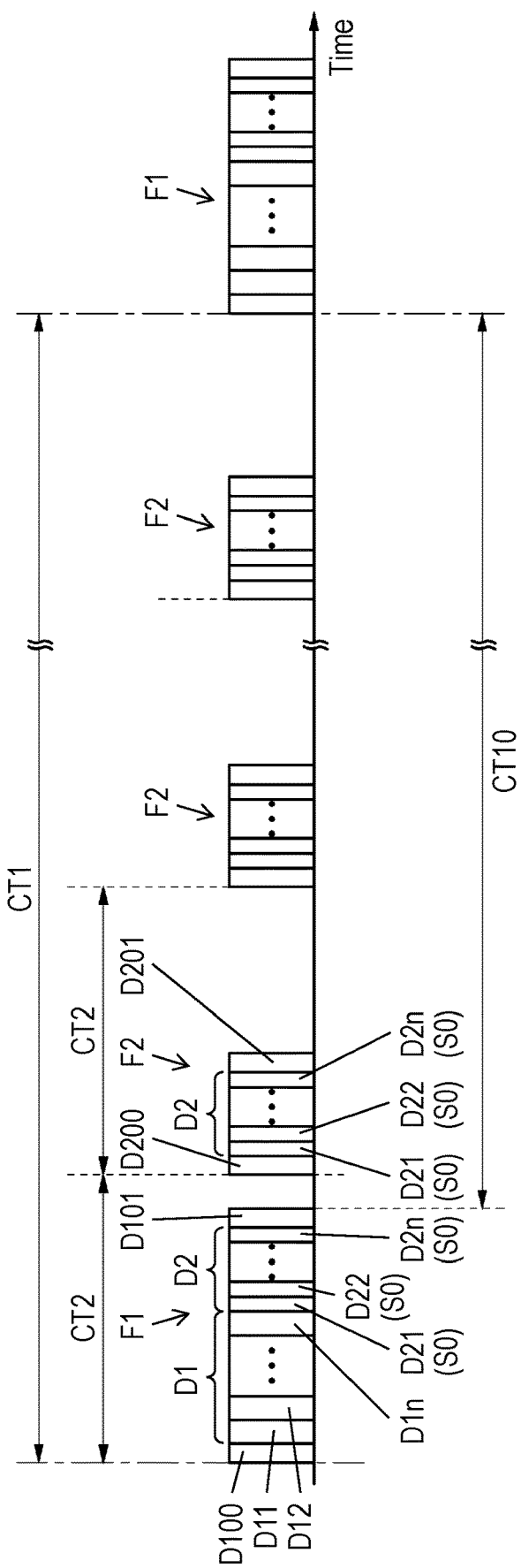
FIG. 2 is an explanatory diagram of communication processing and divided communication processing executed by the communication device according to the exemplary embodiment of the present disclosure.

FIG. 2 is an explanatory diagram of communication processing and divided communication processing executed by communication device 1 according to the exemplary embodiment of the present disclosure. The communication processing is processing for transmitting main frame F1 including main data from communication part 12 to one or more slaves 2 in first period CT1. That is, communication device 1 executes the communication processing to transmit the main data to one or more slaves 2 in first period CT1. For example, when communication device 1 is a controller and one or more slaves 2 are devices such as servo amplifiers to be controlled, the main data may include control data for controlling slaves 2. First period CT1 is, for example, a fraction of ms to a few ms. When receiving the main data, each slave 2 executes processing in accordance with the received main data. For example, when the main data includes one or more pieces of control data corresponding to one or more slaves 2, each slave 2 acquires corresponding control data included in the main data upon receiving the main data, and executes processing in accordance with the acquired control data.

The setting process is processing for setting second period CT2 (see FIG. 2) shorter than first period CT1 and time slot S0 (see FIG. 2). Time slot S0 is allocated to at least one slave 2 among one or more slaves 2 in every second period CT2. Time slot S0 set in the setting processing is included in at least sub-frame F2 (see FIG. 2). Sub-frame F2 is a frame transmitted from communication device 1 in second period CT2 set in the setting processing, and is shorter than a transfer time of main frame F1. Second period CT2 is longer than a transfer time of sub-frame F2. Each slave 2 can acquire data included in the corresponding time slot S0 or transmit data to another device (communication device 1 or another slave 2) using corresponding time slot S0.

As described above, slave 2 to which time slot S0 is allocated by the setting processing can periodically receive the sub-data using time slot S0 in every second period CT2 separately from the main data transmitted in first period CT1. Slave 2 to which time slot S0 is allocated by the setting processing can periodically transmit the sub-data using time slot S0 in every second period CT2 separately from the main data. That is, in the present exemplary embodiment, it is easy that sub-data is periodically transmitted, received, or transmitted and received in slave 2 connected to communication device 1.

(2) Details

Communication system 100 including communication device 1 will be described in detail below with reference to FIG. 1. A plurality of (here, n) slaves 2 is connected to communication device 1. The plurality of slaves 2 (in other words, one or more slaves 2) is daisy-chained to communication device 1. Specifically, first slave 21, second slave 22, third slave 23, . . . , and nth slave 2n are connected to communication device 1 in this order in a ring shape. Thus, the frame (for example, main frame F1) transmitted from communication device 1 is transferred to first slave 21, second slave 22, third slave 23, . . . , nth slave 2n, and communication device 1 in this order.

In communication system 100, one of the plurality of slaves 2 is a sensor, and remaining slaves 2 are servo amplifiers. In other words, at least one of one or more slaves 2 is a motor drive device that drives a motor. In communication system 100, communication device 1 is a controller that individually or entirely controls the plurality of slaves 2 (that is, the plurality of servo amplifiers and the sensor).

Communication device 1 includes processing part 11 and communication part 12. Communication device 1 stores data in a memory included in processing part 11, but may include a storage part separately from processing part 11. Examples of the storage part are an electrically rewritable nonvolatile memory such as an electrically erasable programmable read-only memory (EEPROM), and a volatile memory such as a random access memory (RAM).

Processing part 11 includes, for example, a computer system. The computer system mainly includes a processor and a memory as hardware. By the processor executing a program recorded in the memory of the computer system, the function of processing part 11 is achieved. The program may be recorded in advance in the memory of the computer system, may be provided through a telecommunication line, or may be provided by being recorded in a non-transitory recording medium readable by the computer system, such as a memory card, an optical disk, or a hard disk drive. Note that at least a part or the whole of communication part 12 may be configured integrally with a part or the whole of processing part 11. For example, communication part 12 includes the computer system. In this configuration, the function of processing part 11 can be achieved by executing the program in the computer system of communication part 12.

Communication part 12 is a communication interface for communicating with the plurality of slaves 2, and includes, for example, a wired communication module conforming to an industrial Ethernet (registered trademark) protocol. Communication part 12 transmits the frames (main frame F1 and sub-frame F2) to communication part 202 (described later) of slave 2 (in FIG. 1, first slave 21) at the foremost stage directly connected to communication device 1. Communication part 12 receives the frames (main frame F1 and sub-frame F2) transmitted from communication part 202 of slave 2 (in FIG. 1, nth slave 2n) at the rearmost stage directly connected to communication device 1.

Processing part 11 has functions for executing the communication processing (main communication processing), the divided communication processing, and the setting processing. Hereinafter, the communication processing (main communication processing) is referred to as the main communication processing to be distinguished from the divided communication processing. The setting processing is processing executed before communication system 100 including communication device 1 is operated. Both the main communication processing and the divided communication processing are processing executed while communication system 100 including communication device 1 is in operation.

The main communication processing is processing for transmitting main frame F1 from communication part 12 to the plurality of slaves 2 in first period CT1. First period CT1 is preset in communication device 1. In the present exemplary embodiment, when communication device 1 transmits main frame F1 to first slave 21, main frame F1 is transferred to first slave 21, second slave 22, third slave 23, . . . , and nth slave 2n in this order.

As illustrated in FIG. 2, main frame F1 includes header D100, main data region D1, sub-data region D2, and footer D101. Header D100 includes an identifier for identifying that the frame received by each slave 2 is main frame F1.

Main data region D1 is divided into a plurality of (here, n) time slots D11, D12, . . . , and D1n. The plurality of time slots D11, D12, . . . , and D1n are allocated to the plurality of slaves 21, 22, . . . , and 2n, respectively.

Slave 2 that has received main frame F1 can acquire the main data from communication device 1 using the allocated time slot in main data region D1. The main data may include control data for each slave 2 transmitted from communication device 1 to each slave 2. The main data may include response data to the control data for each slave 2.

Sub-data region D2 is divided into a plurality of (here, n) time slots D21, D22, . . . , and D2n. The plurality of time slots D21, D22, . . . , and D2n correspond to time slot S0 set in the setting processing, and are allocated to the plurality of slaves 21, 22, . . . , and 2n, respectively. That is, main frame F1 includes time slot S0. Time slot S0 is set in setting processing.

Slave 2 that has received main frame F1 can acquire the sub-data included in allocated time slot S0 in sub-data region D2, and can transmit the sub-data to another device (communication device 1 or another slave 2) using time slot S0. The sub-data may include a variety of data to be transmitted from slave 2 to another slave 2. That is, time slot S0 is used for communication between one or more slaves 2.

The divided communication processing is processing for transmitting subframe F2 from communication part 12 to the plurality of slaves 2 in second period CT2. Second period CT2 is shorter than first period CT1 and is set in the setting process. Sub-frame F2 includes header D200, sub-data region D2, and footer D201. Header D200 includes an identifier for identifying that the frame received by each slave 2 is sub-frame F2.

As illustrated in FIG. 2, processing part 11 of communication device 1 first executes the main communication processing in first period CT1 to transmit main frame F1 from communication part 12. Thereafter, processing part 11 of communication device 1 executes the divided communication processing in first period CT1 to transmit sub-frame F2 from communication part 12 in every second period CT2.

Here, in the present exemplary embodiment, processing part 11 updates the main data in every first period CT1.

Specifically, processing part 11 generates the main data to be included in next main frame F1 between the transmission of main frame F1 and the start of the transmission of next main frame F1. That is, processing part 11 generates the main data and prepares main frame F1 during a time shorter than first period CT1. When generating the main data, processing part 11 refers to, for example, command information from a host system of communication device 1, response information received from each slave 2, and the like. For example, processing part 11 generates control data (main data) for controlling each servo amplifier (each slave 2) by referring to detection information received from the sensor (slave 2). Therefore, first period CT1 needs to be set to such an extent that the processing for generating the main data can be executed, and depends on the processing performance of processing part 11.

The setting processing is processing for setting second period CT2 and time slot S0 to be used in the above-described main communication processing and the divided communication processing. In other words, the main communication processing and the divided communication processing are executed based on parameters set in the setting processing. Second period CT2 is shorter than first period CT1. Processing part 11 sets second period CT2 based on a transfer time (maximum transfer time Mt) of main frame F1 as described below. Note that second period CT2 is longer than maximum transfer time Mt. Time slot S0 is allocated to slaves 2 in every second period CT2. Processing part 11 allocates time slot S0 to all slaves 2. Time slot S0 allocated to each slave 2 in the setting processing constitutes sub-data region D2 described above. The setting processing will be described in detail in "(3) Setting processing" described below. Note that the slot length of time slot S0 allocated to each slave 2 may be different in accordance with a data size.

Slave 2 includes processing part 201 and communication part 202. Slave 2 stores data in a memory included in processing part 201, but may include a storage part separately from processing part 201. The storage part is an electrically rewritable nonvolatile memory such as an EEPROM, a volatile memory such as a RAM, or the like.

Processing part 201 includes, for example, a computer system. The computer system mainly includes a processor and a memory as hardware. By the processor executing a program recorded in the memory of the computer system, the function of processing part 201 is achieved. The program may be recorded in advance in the memory of the computer system, may be provided through a telecommunication line, or may be provided by being recorded in a non-transitory recording medium readable by the computer system, such as a memory card, an optical disk, or a hard disk drive.

Processing part 201 has a function of executing processing based on corresponding data (here, the control data) among the main data received by communication part 202. Further, processing part 201 has a function of executing processing based on corresponding data among the sub-data received by communication part 202. Processing part 201 has a function of executing processing for transmitting the sub-data to another device using allocated time slot S0 in sub-data region D2 of received main frame F1 or sub-frame F2.

Communication part 202 is a communication interface for communicating with communication device 1 or another slave 2, and includes, for example, a wired communication module conforming to an industrial Ethernet (registered trademark) protocol. Communication part 202 receives the frames (main frame F1 and sub-frame F2) transmitted from communication part 12 of communication device 1 at the previous stage directly connected to slave 2 or communication part 202 of slave 2. Communication part 202 transmits the received frames (main frame F1 and sub-frame F2) to communication part 12 of communication device 1 at the subsequent stage directly connected to slave 2 or communication device 202 of slave 2. As an example, communication part 202 of first slave 21 receives the frame transmitted from communication part 12 of communication device 1, and transmits the received frame to communication part 202 of second slave 22. At this time, communication part 202 of first slave 21 may appropriately update the received frame and then transmit the frame.

(3) Setting Processing

Figure 3:
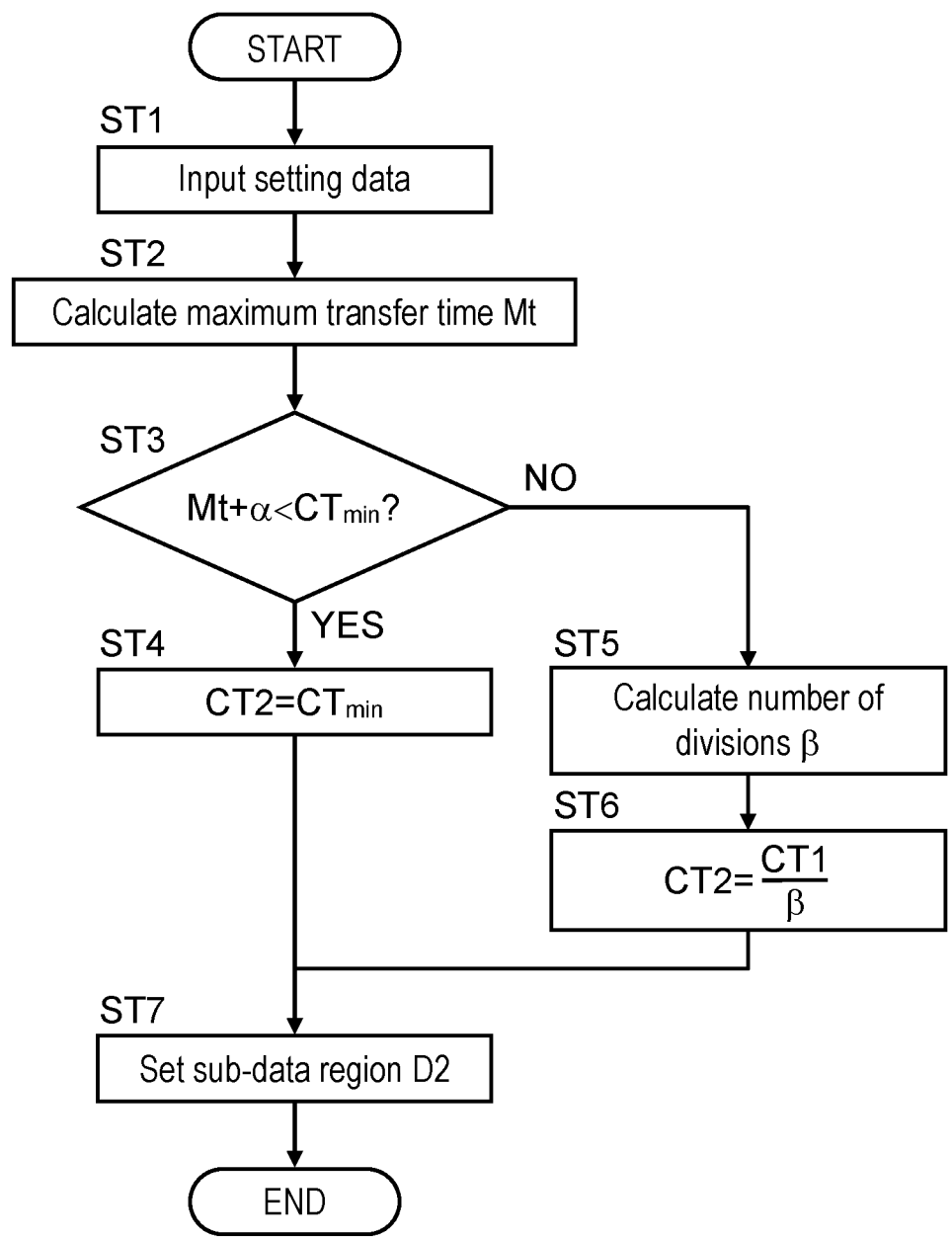
FIG. 3 is a flowchart of setting processing executed by the communication device according to the exemplary embodiment of the present disclosure.

Hereinafter, the setting processing executed by processing part 11 of communication device 1 according to the present exemplary embodiment will be described in detail with reference to FIG. 3. FIG. 3 is a flowchart illustrating the setting processing executed by communication device 1 according to the exemplary embodiment of the present disclosure.

The setting processing is executed by processing part 11 when the user performs a predetermined operation using a user interface included in communication device 1, for example, before communication system 100 is operated. Before the setting processing is executed, the user inputs setting data necessary for executing the setting processing to communication device 1 using the user interface.

The setting data includes a total data size of the main data, a total data size of the sub-data, and minimum communication period $CT_{min}$. The total data size of the main data is the sum of the data sizes of the main data receivable by respective slaves 2. The total data size of the sub-data is the sum of the data sizes of the sub-data transmittable, receivable, or transmittable and receivable by respective slaves 2. Minimum communication period $CT_{min}$ is the minimum communication period allowed for communication between communication device 1 and one or more slaves 2.

The setting data may be acquired by communication device 1 from each slave 2 when the communication between communication device 1 and each slave 2 is established and an initialization frame is transmitted from communication device 1 to each slave 2. That is, communication device 1 acquires the setting data from each slave 2 as a response to the initialization frame. In this case, it is assumed that the setting data is set in each slave 2 in advance, for example, by the user inputting the setting data.

In the setting processing, when the setting data is input (step ST1), processing part 11 first calculates maximum transfer time Mt of main frame F1 using the setting data (step ST2). Specifically, processing part 11 calculates maximum transfer time Mt of main frame F1 by performing calculation based on the following expression (1).

[Mathematical expression 1]

$$Mt = (Sh + Sm + Ss + Sf) \cdot \frac{1}{Tr} + n \cdot Td1 + Td2 \tag{1}$$

In the above expression (1), "Sh" represents the data size of the header of main frame F1, "Sm" represents the total data size of the main data, "Ss" represents the total data size of the sub-data, and "Sf" represents the data size of the footer of main frame F1. In the above expression (1), "Tr" represents a transfer rate, "n" represents the number of devices (communication device 1 and slaves 2) belonging to communication system 100, "Td1" represents a delay time per device, and "Td2" represents a delay time in entire communication system 100.

In the setting processing, processing part 11 then compares maximum transfer time Mt with minimum communication period $CT_{min}$ (step ST3). Specifically, processing part 11 compares the sum of maximum transfer time Mt and time margin α in consideration of jitter with minimum communication period $CT_{min}$. When the sum of maximum transfer time Mt and time margin α is shorter than minimum communication period $CT_{min}$ (Yes in step ST3), processing part 11 sets minimum communication period $CT_{min}$ as second period CT2 (step ST4). On the other hand, when the sum of maximum transfer time Mt and time margin α is longer than or equal to minimum communication period $CT_{min}$ (No in step ST3), processing part 11 sets second period CT2 by performing calculation based on the following expression (2).

[Mathematical expression 2]

$$CT2 = \frac{CT1}{\beta} \tag{2}$$

In the above expression (2), "β" represents the number of divisions. The number of divisions β is a quotient calculated by dividing first period CT1 by the sum of maximum transfer time Mt and time margin α. That is, in the setting processing, processing part 11 calculates the number of divisions β (step ST5), and calculates second period CT2 using the calculated number of divisions β (step ST6).

As described above, in the setting process, processing part 11 calculates the transfer time (maximum transfer time Mt) of main frame F1 based on at least first period CT1, the number of one or more slaves 2, and the data size of the main data. Processing part 11 then sets second period CT2 based on the calculated transfer time (maximum transfer time Mt). In particular, when the sum of maximum transfer time Mt and time margin α is shorter than minimum communication period $CT_{min}$ as described above, processing part 11 sets minimum communication period $CT_{min}$ as second period CT2. That is, in the setting process, processing part 11 sets minimum communication period $CT_{min}$ allowed for communication with one or more slaves 2 as second period CT2.

In the setting processing, processing part 11 sets sub data region D2 transmitted from communication part 12 in every second period CT2 set next (step ST7). In other words, processing part 11 allocates time slot S0 to each slave 2. In the present exemplary embodiment, processing part 11 allocates time slots D21, D22, . . . , and D2n to slaves 21, 22, . . . , and 2n, respectively, as time slot S0.

A specific example of the setting processing will be described below. In the following description, it is assumed that first period CT1 is 500 μs. In the following description, it is assumed that communication system 100 includes three slaves 2 (first slave 21, second slave 22, and third slave 23). That is, in the following description, the number n of devices (communication device 1 and slaves 2) belonging to communication system 100 is four. Further, in the following description, it is assumed that transfer rate Tr is 100 Mbps, delay time Td1 per slave 2 is 3 μs, delay time Td2 in entire communication system 100 is 1.5 μs, and time margin α is 3 μs.

First, a case where the setting data of each slave 2 is the data shown in Table 1 below will be described.

TABLE 1

|  | First slave | Second slave | Third slave |
| --- | --- | --- | --- |
| Data size of main data [Byte] | 32 | 16 | 32 |
| Data size of sub-data [Byte] | 4 | 4 | 8 |
| Adaptable communication period [µs] | 31.25 | 15.625 | 31.25 |

In this case, since total data size Sm of the main data is 80 (=32+16+32) bytes and total data size Ss of the sub-data is 16 (=4+4+8) bytes, maximum transfer time Mt is calculated to be 24.36 µs according to Expression (1). Further, in this case, since adaptable communication periods of first slave 21 and third slave 23 are the longest among adaptable communication periods of all slaves 21, 22, and 23, minimum communication period $CT_{min}$ is 31.25 µs. Thus, since the sum of maximum transfer time Mt and time margin α (24.36 µs+3 µs=27.36 µs) is shorter than minimum communication period $CT_{min}$ (31.25 µs), processing part 11 sets minimum communication period $CT_{min}$ (31.25 µs) as second period CT2.

A case where the setting data of each slave 2 is the data shown in Table 2 below will be then described.

TABLE 2

|  | First slave | Second slave | Third slave |
| --- | --- | --- | --- |
| Data size of main data [Byte] | 64 | 64 | 32 |
| Data size of sub-data [Byte] | 8 | 4 | 32 |
| Adaptable communication period [µs] | 31.25 | 15.625 | 31.25 |

In this case, since total data size Sm of the main data is 160 (=64+64+32) bytes and total data size Ss of the sub-data is 44 (=8+4+32) bytes, maximum transfer time Mt is calculated to be 33 µs according to Expression (1). Further, in this case, since adaptable communication periods of first slave 21 and third slave 23 are the longest among adaptable communication periods of all slaves 21, 22, and 23, minimum communication period $CT_{min}$ is 31.25 µs. Thus, since the sum of maximum transfer time Mt and time margin α (33 µs+3 µs=36 µs) is longer than minimum communication period $CT_{min}$ (31.25 µs), processing part 11 calculates the number of divisions β, and calculates second period CT2 based on the calculated number of divisions β to set second period CT2. The number of divisions β is a quotient calculated by dividing first period CT1 (500 µs) by the sum (36 µs) of maximum transfer time Mt and time margin α, and thus calculated to be "13". Therefore, second period CT2 is calculated to be 38.46 µs according to Expression (2).

Here, when calculated second period CT2 does not coincide with an integral multiple of the adaptable communication period of each slave 2, second period CT2 is set to a value that is larger than calculated second period CT2 and is the integral multiple of the adaptable communication period of each slave 2. Here, second period CT2 is set to 62.5 µs which is twice as long as 31.25 µs which is an adaptable communication period of each slave 2. Note that when there is a plurality of types of slaves 2 having mutually different adaptable communication periods, the least common multiple of the adaptable communication periods of slaves 2 is set as second period CT2.

Figure 4:
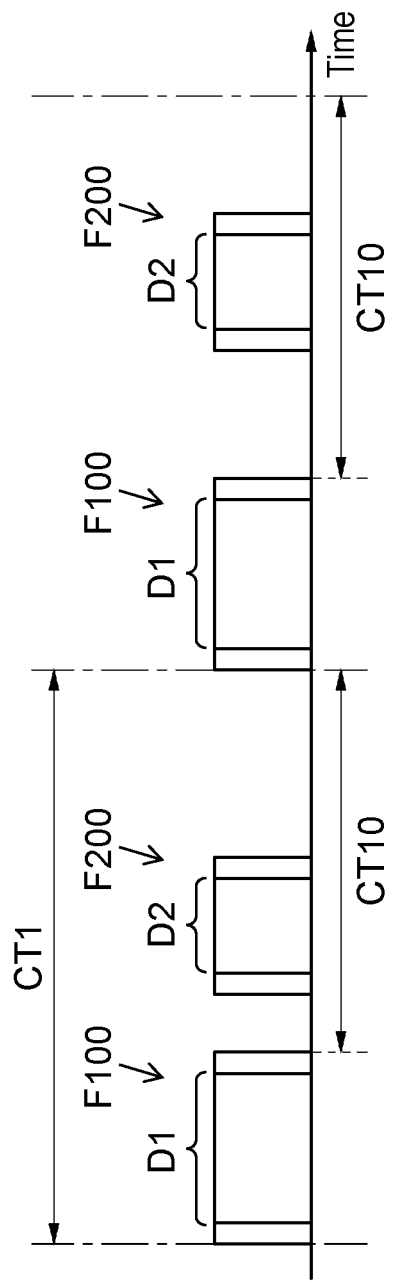
FIG. 4 is an explanatory diagram of communication processing executed by a communication device of a comparative example.

Hereinafter, advantages of communication device 1 according to the present exemplary embodiment will be described with reference to comparison with a communication device of a comparative example. The communication device of the comparative example is different from communication device 1 according to the present exemplary embodiment in that the communication device of the comparative example does not have the function for executing the divided communication processing and the setting processing, that is, does not allocate time slot S0 in every second period CT2. When the sub-data different from the main data is transmitted from communication device 1 or slave 2, the communication device of the comparative example transmits sub-frame F200 including sub-data region D2 in free region CT10 excluding main frame F100 in first period CT1 as illustrated in FIG. 4. However, in the communication device of the comparative example, since second period CT2 is not set and the timing at which sub-frame F200 is transmitted is not defined, the sub-data cannot be periodically transmitted. Therefore, in the communication device of the comparative example, it is difficult to perform periodic communication that can withstand use in an industrial network for the sub-data different from the main data.

On the other hand, in communication device 1 according to the present exemplary embodiment, slave 2 to which time slot S0 is allocated in the setting processing can periodically receive the sub-data using time slot S0 in every second period CT2 separately from the main data transmitted in first period CT1. Further, slave 2 to which time slot S0 is allocated in the setting processing can periodically transmit the sub-data using time slot S0 in every second period CT2 separately from the main data. That is, in the present exemplary embodiment, it is easy that sub-data is periodically transmitted, received, or transmitted and received in slave 2 connected to communication device 1. Therefore, in the present exemplary embodiment, periodic communication that can withstand use in the industrial network is easily performed for not only the main data but also the sub-data.

(4) Modifications

The above-described exemplary embodiment is merely one of various exemplary embodiments of the present disclosure. The above-described exemplary embodiment can be variously changed according to a design and the like as long as the object of the present disclosure can be achieved. Additionally, the same functions as those of communication device 1 may be embodied by a communication control method, a (computer) program, a non-transitory recording medium on which a program is recorded, or the like.

A communication control method according to one aspect includes a communication step and a setting step. The communication step is a step of transmitting main frame F1 including main data to one or more slaves 2 connected to communication device 1 in first period CT1. The setting step is a step of setting second period CT2 shorter than first period CT1 and time slot S0 allocated to at least one slave 2 among one or more slaves 2 in every second period CT2. Further, a program according to one aspect causes one or more processors to execute the communication control method described above.

Modifications of the exemplary embodiment described above will be listed below. The modifications described below can be applied in appropriate combination.

Communication device 1 of the present disclosure includes, for example, a computer system in processing part 11. The computer system mainly includes a processor and a memory as hardware. The processor executes a program recorded in the memory of the computer system to achieve a function of processing part 11 in the present disclosure. The program may be recorded in advance in the memory of the computer system, may be provided through a telecommunication line, or may be provided by being recorded in a non-transitory recording medium readable by the computer system, such as a memory card, an optical disk, or a hard disk drive. The processor of the computer system includes one or a plurality of electronic circuits including a semiconductor integrated circuit (IC) or a large-scale integration (LSI). The integrated circuit such as the IC or the LSI in this disclosure is called differently depending on a degree of integration, and includes an integrated circuit called a system LSI, a very large scale integration (VLSI), or an ultra large scale integration (ULSI). Furthermore, a field programmable gate array (FPGA) programmed after manufacture of LSI, and a logical device capable of reconfiguring a joint relationship inside LSI or reconfiguring circuit partitions inside LSI can also be used as processors. The plurality of electronic circuits may be integrated into one chip or may be provided in a distributed manner on a plurality of chips. The plurality of chips may be aggregated in one device or may be provided in a distributed manner in a plurality of devices. The computer system in this disclosure includes a microcontroller having one or more processors and one or more memories. Therefore, the microcontroller is also constituted by one or a plurality of electronic circuits including a semiconductor integrated circuit or a large-scale integrated circuit.

In addition, integration of a plurality of functions in processing part 11 into one housing is not essential for processing part 11. The components of processing part 11 may be distributed in a plurality of housings. Further, at least some of the functions of processing part 11 may be achieved by a server device, or a cloud (cloud computing), for example. On the contrary, as in the above-described exemplary embodiment, all the functions of processing part 11 may be integrated into one housing.

In the above-described exemplary embodiment, when slave 2 having a comparatively long adaptable communication period in the setting processing belongs to communication system 100, processing part 11 of communication device 1 may make the adaptable communication period of slave 2 equal to adaptable communication periods of other slaves 2. That is, the adaptable communication period of slave 2 is a period necessary for executing processing having a comparatively large processing load, such as processing for generating and transmitting data. Therefore, in a case where processing having a comparatively small processing load such as processing for simply acquiring data is executed, the adaptable communication period of slave 2 can be set to be short. As described above, when the adaptable communication period of slave 2 is made to be equal to the other adaptable communication periods, minimum communication period $CT_{min}$ can be adjusted as a result. In other words, minimum communication period $CT_{min}$ may be set to any value.

In the above-described exemplary embodiment, time slot S0 may vary to some extent based on a predetermined time. That is, the deviation of time slot S0 is preferably within an allowable time shorter than at least second period CT2. Specifically, in second period CT2 for transmitting main frame F1, if slave 2 can complete the reception of time slot S0 before the end of second period CT2, the transmission of time slot S0 may be started at any timing. For example, even in a case where the end timing of main data region D1 is later than the example illustrated in FIG. 2, if the reception of time slot S0 in each slave 2 is completed before the end of second period CT2, a deviation of the timing to start the transmission of time slot S0 is allowed.

In the setting processing in the above-described exemplary embodiment, when a plurality of types of slaves 2 having mutually different adaptable communication periods is present, the least common multiple of the adaptable communication periods is set as second period CT2, but the present disclosure is not limited thereto. For example, time slot S0 may be allocated to not all the plurality of types of slaves 2, but time slot S0 does not have to be allocated to some of slaves 2. For example, if time slot S0 is to be allocated to only one type of slave 2 among the plurality of types of slaves 2, second period CT2 is set to an adaptable communication period of this type of slave 2.

In the setting processing according to the above-described exemplary embodiment, even when calculated second period CT2 does not coincide with an integral multiple of the adaptable communication period of each slave 2, calculated second period CT2 may be set as it is as second period CT2.

In the above-described exemplary embodiment, slave 2 is not limited to the motor drive device, and may be another device such as a sensor. Further, in the above exemplary embodiment, the motor drive device may not be included in the plurality of slaves 2. For example, all slaves 2 may be sensors.

In the above-described exemplary embodiment, the number of slaves 2 belonging to communication system 100 may be one. In this aspect, communication device 1 can acquire the sub-data transmitted from slave 2 in second period CT2 while generating the main data in every first period CT1.

In the above exemplary embodiment, communication device 1 performs wired communication with each slave 2 using a wired communication module, but the present disclosure is not limited thereto. For example, communication device 1 may perform wireless communication with each slave 2 using a wireless communication module.

In the above-described exemplary embodiment, processing part 201 of slave 2 may cause communication part 202 to transmit data other than the sub-data using, for example, empty region CT10 (see FIG. 2) excluding main frame F1 or sub-frame F2 in second period CT2. As an example, the other data is data having a larger data size than control data included in the main data, and may include an image or the like used for monitoring or managing a manufacturing process or the like in a production line or a factory. Unlike the main data and the sub-data, the other data does not require punctuality and real-time property.

In the above-described exemplary embodiment, processing part 11 of communication device 1 does not transmit the sub-data to each slave 2 in the main communication processing and the divided communication processing, but may transmit the sub-data to each slave 2. That is, if there is a margin in the processing performance of processing part 11, processing part 11 can execute the processing for generating the sub-data in parallel with the processing for generating the main data and transmit the generated sub-data to each slave 2.

(Conclusion)

As described above, communication device (1) according to a first aspect includes processing part (11), and communication part (12) that communicates with one or more slaves (2). Processing part (11) has the function of executing the communication processing and the setting processing. The communication processing is processing for transmitting main frame (F1) including the main data from communication part (12) to one or more slaves (2) in first period (CT1). The setting processing is processing for setting second period (CT2) shorter than first period (CT1) and time slot (S0) allocated to at least one slave (2) among one or more slaves (2) in every second period (CT2).

According to this aspect, the sub-data different from the main data can be periodically transmitted, received, or transmitted and received using time slot (S0). Thus, this aspect makes it easy to periodically transmit, receive, or transmit and receive the sub-data in slave (2) connected to communication device (1).

In communication device (1) according to a second aspect, main frame (F1) includes time slot (S0) in the first aspect.

This aspect makes it is easy to avoid a situation where the sub-data is transmitted, received, or transmitted and received in slave (2) at an interval longer than second period (CT2).

In communication device (1) according to a third aspect, in the first or second aspect, one or more slaves (2) are daisy-chained to communication device (1).

According to this aspect, since communication device (1) may transmit the frame only to slave (2) directly connected to communication device (1) among one or more slaves (2), the processing load of communication device (1) is easily reduced.

In communication device (1) according to a fourth aspect, in any one of the first to third aspects, in the setting processing, processing part (11) calculates the transfer time (maximum transfer time (Mt)) of main frame (F1) based on at least first period (CT1), the number of one or more slaves (2), and the data size of the main data, and sets second period (CT2) based on the calculated transfer time.

This aspect makes it easy to set the number of times of second period (CT2) included in first period (CT1) to a large value, and as a result, easy to increase the number of times of transmission, reception, or transmission and reception of the sub-data in first period (CT1).

In communication device (1) according to a fifth aspect, in the fourth aspect, processing part (11) sets, as second period (CT2), minimum communication period ($CT_{min}$) allowed for communication with one or more slaves (2) in the setting processing.

This aspect makes it easy to set the number of times of second period (CT2) included in first period (CT1) to a large value, and as a result, easy to increase the number of times of transmission, reception, or transmission and reception of the sub-data in first period (CT1).

In communication device (1) according to a sixth aspect, minimum communication period ($CT_{min}$) can be set to any value in the fifth aspect.

According to this aspect, the degree of freedom in setting second period (CT2) can be improved.

In communication device (1) according to a seventh aspect, in the fourth aspect, processing part (11) sets, as second period (CT2), a period that is an integral multiple of the adaptable communication period of one or more slaves (2) in the setting processing.

According to this aspect, synchronization between communication device (1) and one or more slaves (2) can be easily achieved.

In communication device (1) according to an eighth aspect, in any one of the first to seventh aspects, the deviation of second period (CT2) falls within an allowable time shorter than at least second period (CT2).

This aspect makes it easy to avoid a situation where the sub-data is transmitted, received, or transmitted and received in slave (2) at an interval longer than second period (CT2).

In communication device (1) according to a ninth aspect, in any one of the first to eighth aspects, time slot (S0) is used for the communication with one or more slaves (2).

According to this aspect, control of one or more slaves (2) is easily made using the sub-data.

In communication device (1) according to a tenth aspect, in any one of the first to ninth aspects, at least one slave (2) among one or more slaves (2) is a motor drive device that drives a motor.

This aspect makes it is easy to periodically control the motor drive device using not only the main data but also the sub-data.

Communication system (100) according to an eleventh aspect includes communication device (1) according to any one of the first to tenth aspects, and one or more slaves (2). One or more slaves (2) are connected to communication device (1) and communicate with communication device (1).

According to this aspect, the sub-data different from the main data can be periodically transmitted, received, or transmitted and received using time slot (S0). Thus, this aspect makes it easy to periodically transmit, receive, or transmit and receive the sub-data in slave (2) connected to communication device (1).

A communication control method according to a twelfth aspect includes a communication step and a setting step. The communication step is a step of transmitting main frame (F1) including the main data to one or more slaves 2 connected to communication device 1 in first period (CT1). The setting step is a step of setting second period (CT2) shorter than first period (CT1) and time slot (S0) allocated to at least one slave (2) among one or more slaves (2) in every second period (CT2).

According to this aspect, the sub-data different from the main data can be periodically transmitted, received, or transmitted and received using time slot (S0). Thus, this aspect makes it easy to periodically transmit, receive, or transmit and receive the sub-data in slave (2) connected to communication device (1).

A program according to a thirteenth aspect causes one or more processors to execute the communication control method according to the twelfth aspect.

According to this aspect, the sub-data different from the main data can be periodically transmitted, received, or transmitted and received using time slot (S0). Thus, this aspect makes it easy to periodically transmit, receive, or transmit and receive the sub-data in slave (2) connected to communication device (1).

The configurations according to the second to tenth aspects are not essential configurations for communication device (1), and can be appropriately omitted.

The invention claimed is:

1. A communication device comprising:
a processing part; and
a communication part that transmits a main frame including main data in a first period and communicates with one slave or a plurality of slaves, wherein:
the processing part has a function of
executing communication processing for generating the main frame within a time shorter than the first period, and
executing setting processing for setting a second period and one time slot or a plurality of time slots,
the second period is shorter than the first period and longer than a transfer time of the main data, the one time slot or the plurality of time slots are allocated to the one slave or the plurality of slaves, respectively, in every second period,
the communication part communicates with each of the one slave or the plurality of slaves in a corresponding one of the plurality of time slot, so that the communication part communicates with all the one slave or the plurality of slaves in every second periods, and
a total time period of the one time slot or the plurality of time slots in every second period is shorter than the second time period.

2. The communication device according to claim 1, wherein the main frame includes the one time slot or one of the plurality of time slots.

3. The communication device according to claim 1, wherein:
the communication part communicates with the plurality of slaves, and
the plurality of slaves are daisy-chained to the communication device.

4. The communication device according to claim 1, wherein in the setting processing, the processing part calculates a transfer time of the main frame based on at least the first period, a number of the one slave or the plurality of slaves, and a data size of the main data, and sets the second period based on the calculated transfer time.

5. The communication device according to claim 4, wherein the processing part sets a minimum communication period allowed for communication with the one slave or the plurality of slaves as the second period in the setting processing.

6. The communication device according to claim 5, wherein the minimum communication period is set to any value.

7. The communication device according to claim 4, wherein in the setting processing, the processing part sets a period that is an integral multiple of an adaptable communication period of the one slave or the plurality of slaves as the second period.

8. The communication device according to claim 1, wherein a deviation of one of the one time slot or the plurality of time slots falls within at least an allowable time shorter than the second period.

9. The communication device according to claim 1, wherein at least one slave among the one slave or the plurality of slaves is a motor drive device that drives a motor.

10. A communication system comprising:
the communication device according to claim 1; and
the one slave or the plurality of slaves that are connected to the communication device and communicate with the communication device.

11. The communication device according to claim 1, wherein:
the communication part communicates with the plurality of slaves,
a plurality of time slots are set, and
a total time period of the plurality of time slots in every second period is shorter than the second time period.

12. A communication control method comprising:
transmitting a main frame including main data to one slave or a plurality of slaves connected to a communication device in a first period;
setting a second period and one time slot or a plurality of time slots, the second period being shorter than the first period, the one time slot or the plurality of time slots being allocated to the one slave or the plurality of slaves, respectively, in every second period; and
communicating each of the one slave or the plurality of slaves in a corresponding one of the one time slot or the plurality of time slots, so that the communication part communicates with all the or the plurality of slaves in every second periods, a total time period of the one time slot or the plurality of time slots in every second period being shorter than the second time period.

13. A communication device comprising:
a processing part; and
a communication part that transmits a main frame including main data in a first cycle and communicates with one or more slave including a first slave, wherein:
the processing part is configured to
execute main communication processing for generating at least the main frame within a time shorter than the first cycle,
executing setting processing for setting a plurality of time slots to be allocated to the first slave to the main frame and one sub frame or to a plurality of sub frames, such that the first slave communicates with the processing part twice or more times in a second cycle that is shorter than the first cycle, and
executing divided communication processing for transmitting, during a free time region excluding the main frame within the first cycle, the one sub frame following the main frame or the plurality of sub frames in the second cycle,
the plurality of time slots are utilized by the first slave to transmit, by using the main frame and the one sub frame or the plurality of sub frames, a plurality of sub data to another device in every second cycle or to receive the plurality of sub data in every second cycle, and
in the setting processing, the processing part calculates a transfer time of the main frame based on at least the first cycle, a number of the one or more slaves and a data size of the main data, and sets the second cycle based on the calculated transfer time so that the second cycle is shorter than the first cycle and longer than the transfer time.

14. The communication device according to claim 13, wherein the main frame comprises one of the plurality of time slots.

15. The communication device according to claim 13, wherein:
the communication part communicates with a plurality of slaves, and
the plurality of slaves are daisy-chained to the communication device.

16. The communication device according to claim 13, wherein:
the one or more slaves further includes a second slave, and
the plurality of sub data are transmitted between the first slave and the second slave in the first cycle.

17. The communication device according to claim 13, wherein the processing part sets a minimum communication cycle allowed for communication with the first slave as the second cycle in the setting processing.

18. The communication device according to claim 17, wherein the minimum communication cycle is set to any value.

19. The communication device according to claim 13, wherein in the setting processing, the processing part sets a period that is an integral multiple of an adaptable communication cycle of the first slave as the second cycle.

20. The communication device according to claim 13, wherein a deviation of one of the plurality of time slots falls within at least an allowable time shorter than the second cycle.

\* \* \* \* \*